United States Patent
Durello et al.

(10) Patent No.: US 9,180,772 B2
(45) Date of Patent: Nov. 10, 2015

(54) FAN ASSEMBLY FOR VEHICLES

(75) Inventors: Paolo Durello, Poirino (IT); Francesco Mercogliano, Poirino (IT)

(73) Assignee: Denso Thermal Systems S.P.A., Poirino (Torino) (IT)

(*) Notice: Subject to any disclaimer, the term of this patent is extended or adjusted under 35 U.S.C. 154(b) by 815 days.

(21) Appl. No.: 13/456,086

(22) Filed: Apr. 25, 2012

(65) Prior Publication Data

US 2012/0275901 A1    Nov. 1, 2012

(30) Foreign Application Priority Data

Apr. 26, 2011 (IT) ............................. TO2011A0362

(51) Int. Cl.
F04D 29/66 (2006.01)
B60K 11/02 (2006.01)
F04D 29/16 (2006.01)
F04D 29/52 (2006.01)

(52) U.S. Cl.
CPC .............. B60K 11/02 (2013.01); F04D 29/164 (2013.01); F04D 29/526 (2013.01)

(58) Field of Classification Search
CPC ... F04D 29/164; F04D 29/526; F04D 29/545; F04D 29/547; F04D 29/667; F05D 2250/23
USPC ............. 415/119, 173.5, 173.6, 208.5, 219.1, 415/220, 223; 416/189, 190, 192
See application file for complete search history.

(56) References Cited

U.S. PATENT DOCUMENTS

| 3,832,085 A * | 8/1974 | DeFauw et al. ............... 415/119 |
| 5,489,186 A | 2/1996 | Yapp et al. |
| 6,595,744 B2 * | 7/2003 | Van Houten ............... 415/173.1 |
| 6,863,496 B2 | 3/2005 | Cho et al. |
| 6,874,990 B2 | 4/2005 | Nadeau |
| 7,481,615 B2 | 1/2009 | Park |
| 2003/0161728 A1 | 8/2003 | Cho et al. |
| 2004/0156712 A1 | 8/2004 | Nadeau |
| 2006/0216147 A1 | 9/2006 | Park |
| 2010/0098536 A1 * | 4/2010 | Guemmer ................. 415/208.1 |

FOREIGN PATENT DOCUMENTS

| EP | 1914402 A1 | 4/2008 |
| EP | 1933039 A1 | 6/2008 |
| GB | 2000477 A | 1/1979 |

OTHER PUBLICATIONS

European Search Report, EP Application No. 12165285.3, Dated May 16, 2012.
Italian search report for application No. TO20110362 dated Aug. 22, 2011.

* cited by examiner

Primary Examiner — Edward Look
Assistant Examiner — Jesse Prager
(74) Attorney, Agent, or Firm — Patterson & Sheridan, LLP (57) ABSTRACT

A fan assembly comprising, a shroud having a through opening, around which the shroud defines an air conveying ring, a motor-fan assembly which includes an axial fan rotatable with respect to the support about an axis of rotation, and a noise-reducing annular structure, having a plurality of projections which are arranged in succession in a circumferential direction and extend radially towards the axis of rotation of the fan, each projection having a face which is directed towards the axis of rotation and is substantially parallel thereto, and a plurality of portions radially recessed towards the air conveying ring. Each of the recessed portions has a face which is directed towards the axis of rotation of the fan and the profile of which in the axial direction is generally curvilinear and not parallel to the axis of rotation.

5 Claims, 10 Drawing Sheets

FAN ASSEMBLY FOR VEHICLES

CROSS-REFERENCE TO RELATED APPLICATIONS

This application claims benefit of Italian patent application number TO2011A000362, filed Apr. 26, 2011, which is herein incorporated by reference.

BACKGROUND OF THE INVENTION

1. Field of the Invention

The present invention relates to a fan assembly for cooling a radiator, a radiator-condenser assembly or a radiator-condenser-intercooler assembly of a vehicle, comprising:

a shroud having a through-opening, around which said shroud defines an air conveying ring, and a support which is located at the centre of said opening, a motor-fan assembly which is mounted in said support and includes an axial fan rotatable with respect to said support about an axis of rotation, and a noise-reducing annular structure, fixed to the air conveying ring and surrounding said fan, said annular structure having a plurality of projections which are arranged in succession in a circumferential direction and extend radially towards the axis of rotation of the fan, each projection having a face which is bounded by side edges in the circumferential direction and is directed towards said axis of rotation and is substantially parallel thereto, and a plurality of portions radially recessed towards the air conveying ring and arranged alternating with said projections.

2. Description of the Related Art

A fan assembly of this type is described in EP 1 914 402. Fan assemblies with different forms of the annular structure for reducing the tonal noise are described by the documents U.S. Pat. No. 5,489,186, U.S. Pat. No. 6,863,496, U.S. Pat. No. 7,481,615 and U.S. Pat. No. 6,874,990.

As is known, in order to attenuate air recirculation effects in the fan assembly it is required to reduce as far as possible the distance between the tip of the fan blades and the air conveying ring or, in the case of a fan provided with an outer ring which interconnects the ends of the blades, the distance between this outer ring and the air conveying ring.

The fan is the main source of tonal noise; since it consists of a fairly large number of rotating blades it produces, by its nature, a "non-stationary lift" which is the main source of noise.

The acoustic combination of fan and conveyor, in terms of combined air volume, has an effect on the spatial distribution and the directivity of the acoustic pressure field produced by the "non-stationary lift" and therefore influences the tonal component of the resultant noise.

The presence of an air layer between fan and conveyor contributes functionally to rotation of the fan without interfering with the structure of the conveyor which supports the fan and ensures a suitable fluid dynamic interaction for obtaining the desired pressure difference between upstream side and downstream side of the fan.

From a fluid dynamic point of view, reducing the combined air volume results in an increase in the efficiency, defined as the ratio between output fluid dynamic power (Q·ΔP) and input electric power (V·I); reducing the abovementioned volume in turn results in an increase in the pressure difference imparted by the system to the recirculation flows which are generated at the tips of the blades, therefore opposing the associated losses.

The existence of an air volume between the conveyor and the fan causes a general increase in the wide-band noise, but in particular intensifies the radial modes which maintain the fluctuations in lift produced by the rotation of the blades; these fluctuations in lift result in generation of localized sound-pressure spectral lobes. Moreover, the presence of a wall surrounding the fan produces sound diffusion and reflection effects which contribute to the fluctuations of the existing acoustic field.

In order to solve these problems, in the past different noise-reduction structures have been proposed: for example those described in the documents EP 1,914,402, U.S. Pat. No. 5,489,186, U.S. Pat. No. 6,863,496, U.S. Pat. No. 7,481,615 and U.S. Pat. No. 6,874,990 mentioned above.

The presence of these noise-reduction structures results in irregularity of the surface of the conveying ring which may have one or both the effects as mentioned:

1) favour diffraction and diffusion of the pressure waves in a plane perpendicular to the axis of the fan, resulting in random spatial distribution of the acoustic pressure waves, with a consequent reduction in the tonal component of the noise generated;

2) induce the formation of vortices inside the spaces which have the effect of reducing the fluid-dynamic cross-section, thus preserving the fluid-dynamic performance (lift/head).

SUMMARY OF THE INVENTION

One object of the present invention is to provide an alternative form of the noise-reducing annular structure which diminishes the tonal component of the noise generated by the fan without altering the efficiency of the system in terms of delivery air flow rate and head.

This object is achieved according to the invention by a fan assembly of the type defined in the introduction in which said recessed portions (the spaces present between the projections) each have a face which is directed towards the axis of rotation of the fan and the profile of which in the axial direction is generally curvilinear and not parallel to said axis of rotation.

Preferred embodiments of the invention are defined in the dependent claims which are to be understood as forming an integral part of the present description.

BRIEF DESCRIPTION OF THE DRAWINGS

Further characteristic features and advantages of the fan assembly according to the invention will become clear from the following detailed description of an embodiment of the invention provided with reference to the accompanying drawings and provided purely by way of a non-limiting example in which.

DETAILED DESCRIPTION

Figure 1:
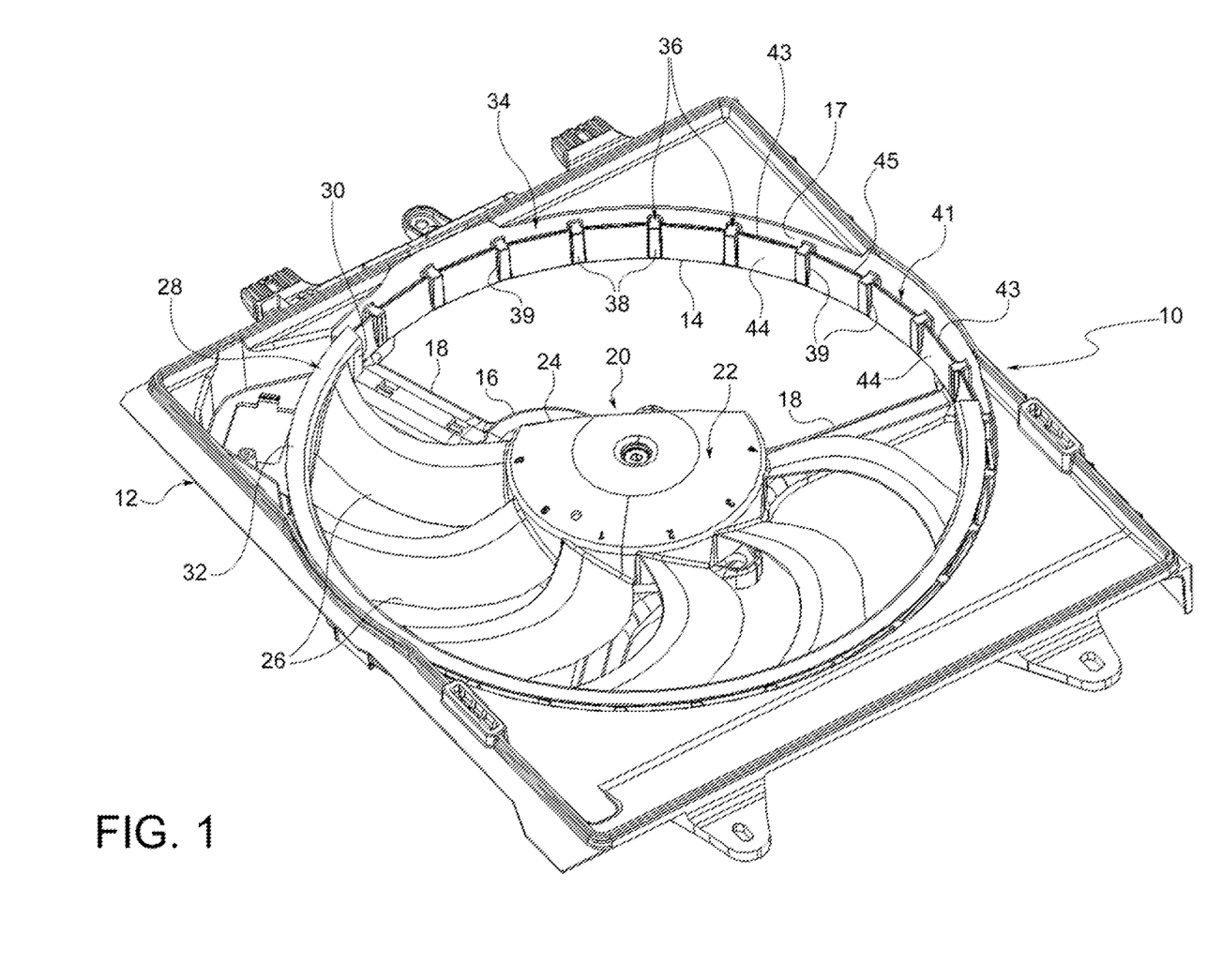
FIGS. 1 and 2 are perspective views of a fan assembly according to the invention.
Figure 2:
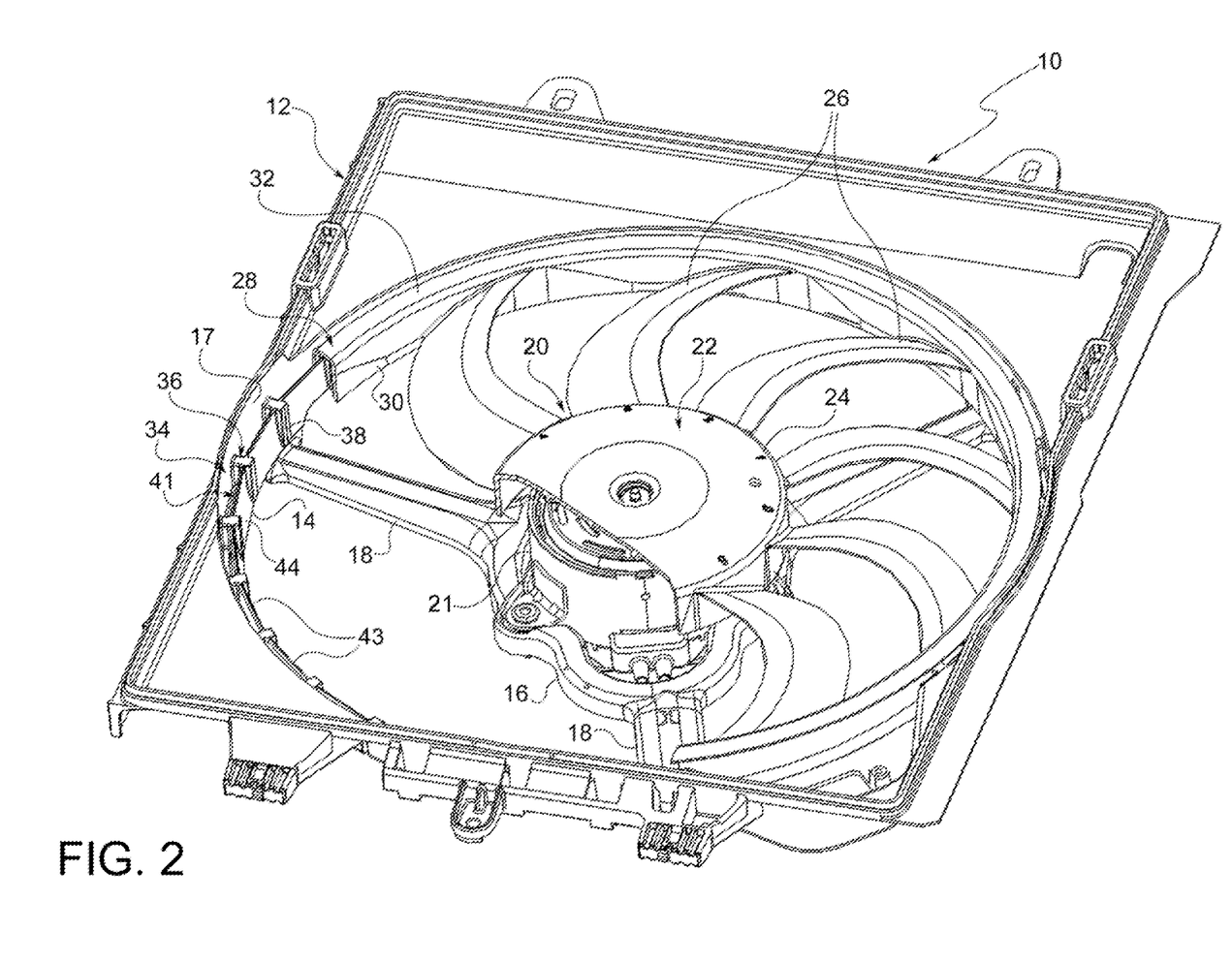

With reference to FIGS. 1 and 2, 10 denotes a fan assembly for cooling a radiator, a radiator-condenser assembly or a radiator-condenser-intercooler assembly of a vehicle. The fan assembly comprises a shroud 12 preferably made of injection-moulded plastic and having a form suitable for conveying an air flow towards a radiator, a radiator-condenser assembly or a radiator-condenser-intercooler assembly.

Figure 3:
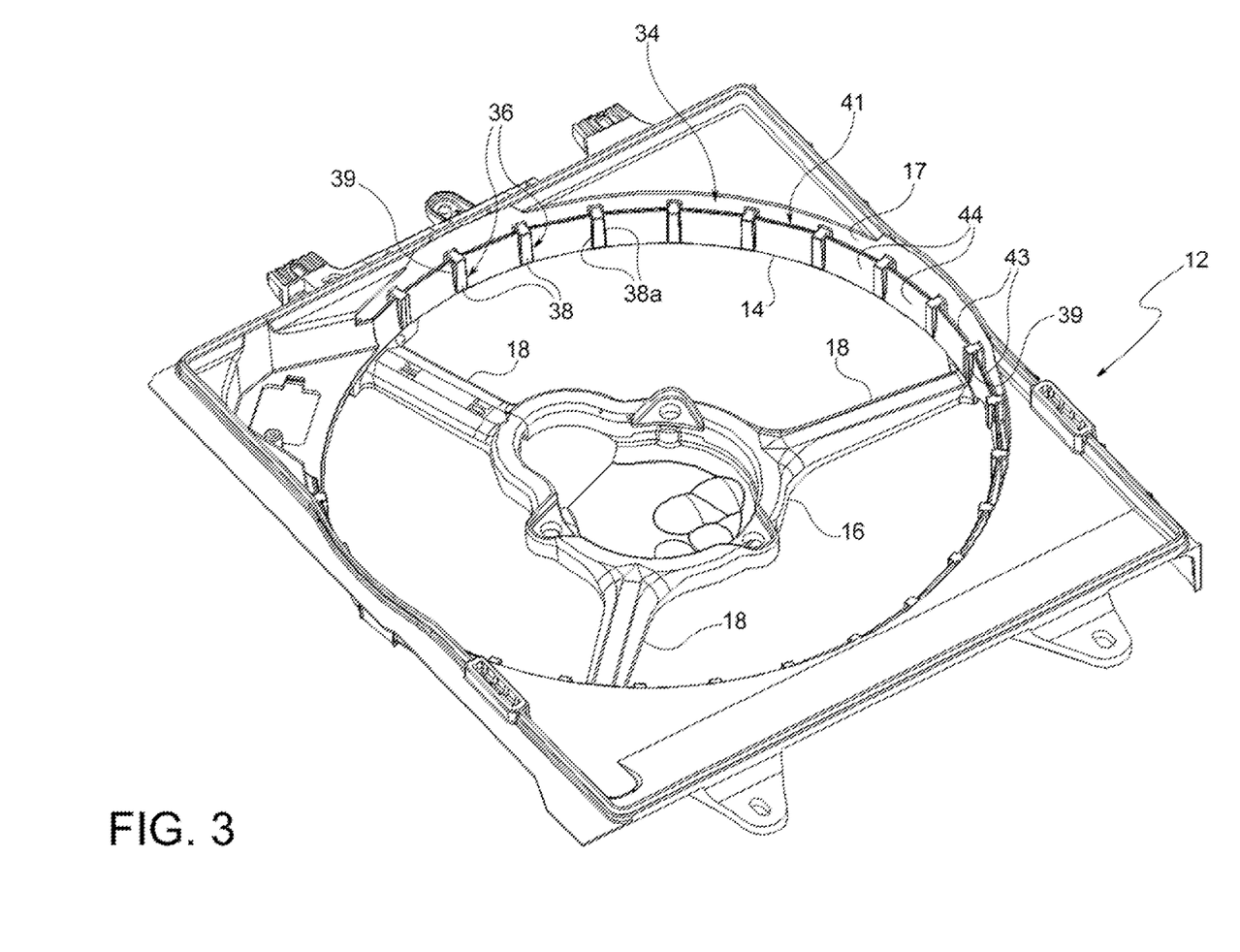
FIG. 3 is a perspective view of a shroud of the fan assembly according to FIG. 1.
Figure 5:
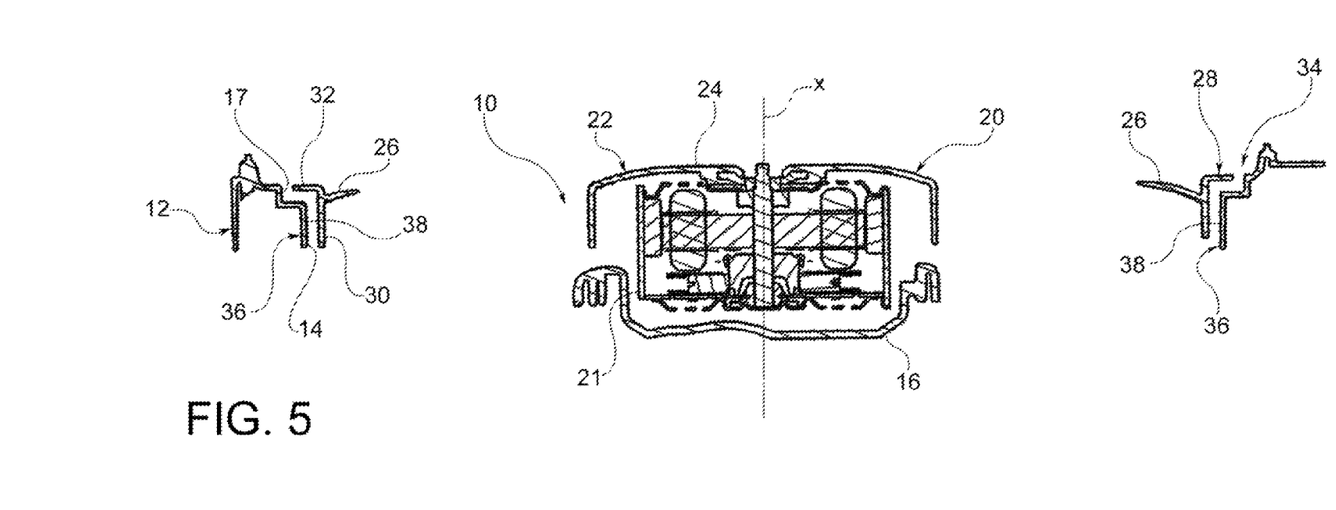
FIGS. 5 and 6 are cross-sectional views of the fan assembly according to FIG. 1 along different radial planes.

With reference in particular to FIG. 3, the shroud 12 has a through-opening 14 and a support 16 located at the centre of the opening 14. The shroud 12 defines an air conveying ring 17 around the opening 14. The support 16 is connected to the air conveying ring 17 by means of radial arms 18. A motor-fan assembly denoted by 20 in FIG. 1 is mounted on the support 16. The motor-fan assembly 20 comprises an electric motor 21 and an axial fan 22 made of injection-moulded plastic. The fan 22 comprises a hub 24 from which a plurality of blades 26 extends. The fan 22 is rotatable with respect to the support 16 about an axis of rotation indicated by X in FIG. 5.

As can be seen in FIGS. 1 and 2, the fan 22 may be provided with an outer ring 28 which is joined to the outer ends of the blades 26. The outer ring 28, if present, is formed by a substantially cylindrical wall 30 coaxial with the axis of rotation X and a radial wall 32 contained in a plane perpendicular to the axis of rotation X.

Figure 4:
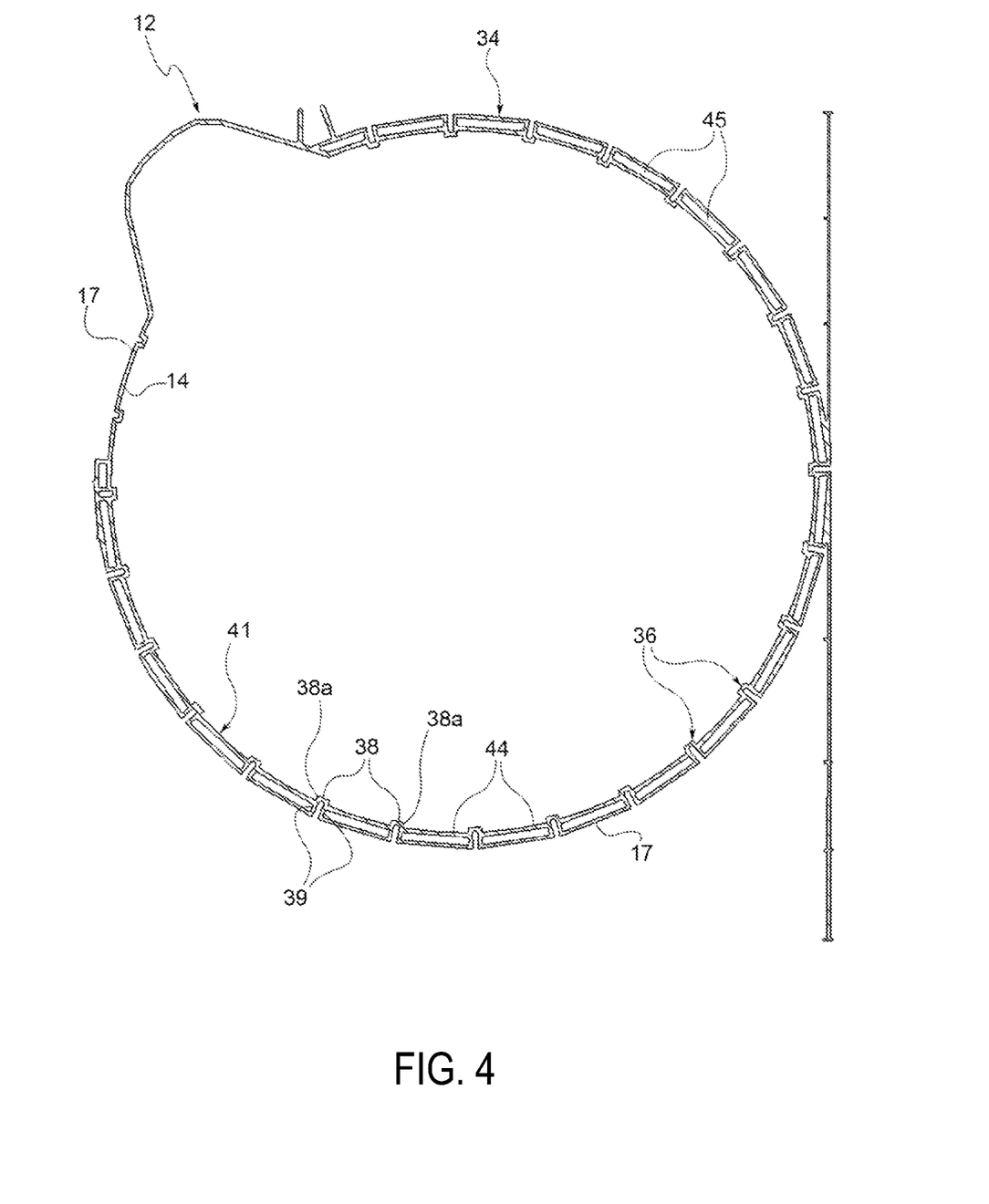
FIG. 4 is a cross-sectional view of the shroud according to FIG. 3.

The shroud 12 comprises a noise-reducing annular structure 34 which is fixed to or formed integrally with the shroud and is situated along the air conveying ring 17 and therefore joined to this ring. The noise-reducing annular structure 34 surrounds the fan 22 and is provided with a plurality of prism formations 36 with a quadrilateral base which are arranged in succession in a circumferential direction. Each prism formation 36 has a preferably square or rectangular cross-section and extends in an axial direction from a bottom wall of the air conveying ring 17. Each prism formation 36 also extends in a radial direction from a side wall of the air conveying ring 17, forming a projection which extends radially towards the axis of rotation X of the fan 22. As can be seen in FIG. 4, the prism formations 36 are hollow formations, defining respective cavities which emerge on the radially outer side of the air conveying ring 17, while they are closed on the radially inner side and on the air inlet side of the conveyor assembly (top side in the figures).

Each prism formation 36 has a radially inner face 38, which is bounded in the circumferential direction by side edges 38a and is directed towards the axis of rotation X and is substantially parallel thereto, and a pair of side faces 39 which are parallel to each other and which extend from the side edges 38a as far as the air conveying ring 17. According to an embodiment of the invention, the prism formations are arranged aligned with respect to the radial direction, namely with side faces 39 parallel with respect to radial centre lines respectively associated with these prism formations so that the radially inner face 38 is perpendicular to these radial lines. According to an alternative embodiment, the prism formations are arranged slightly out-of-alignment with respect to the radial direction, namely slightly rotated with respect to an axis oriented in the axial direction, so that the radially inner face 38 is arranged at an angle other than 90° with respect to the radial direction.

Figure 6:
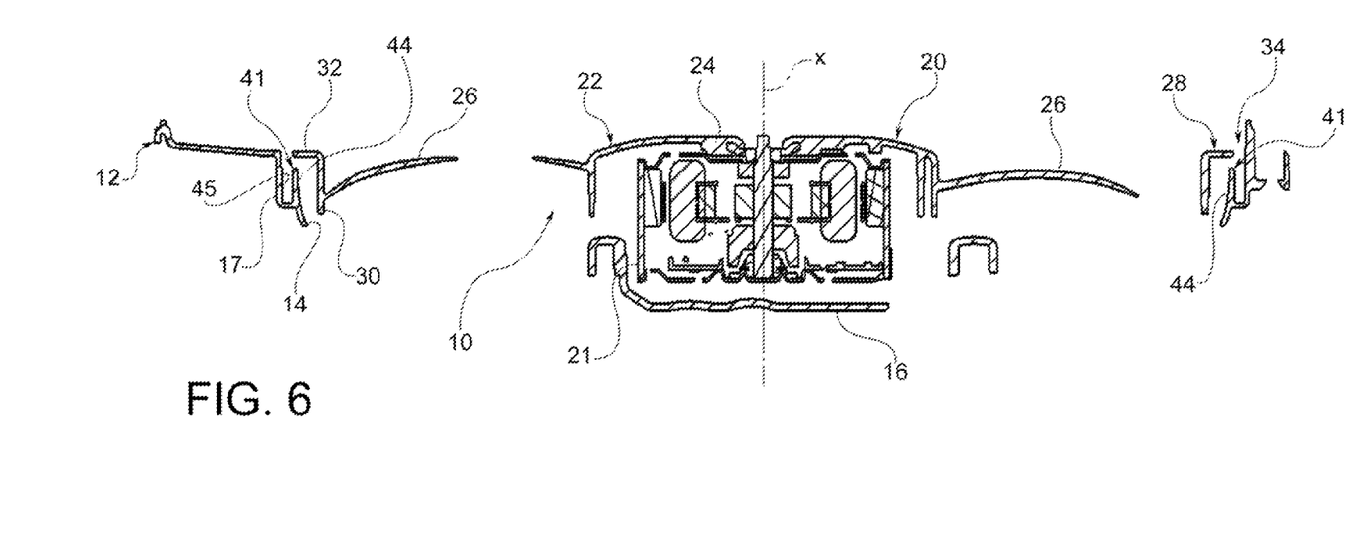
Figure 7:
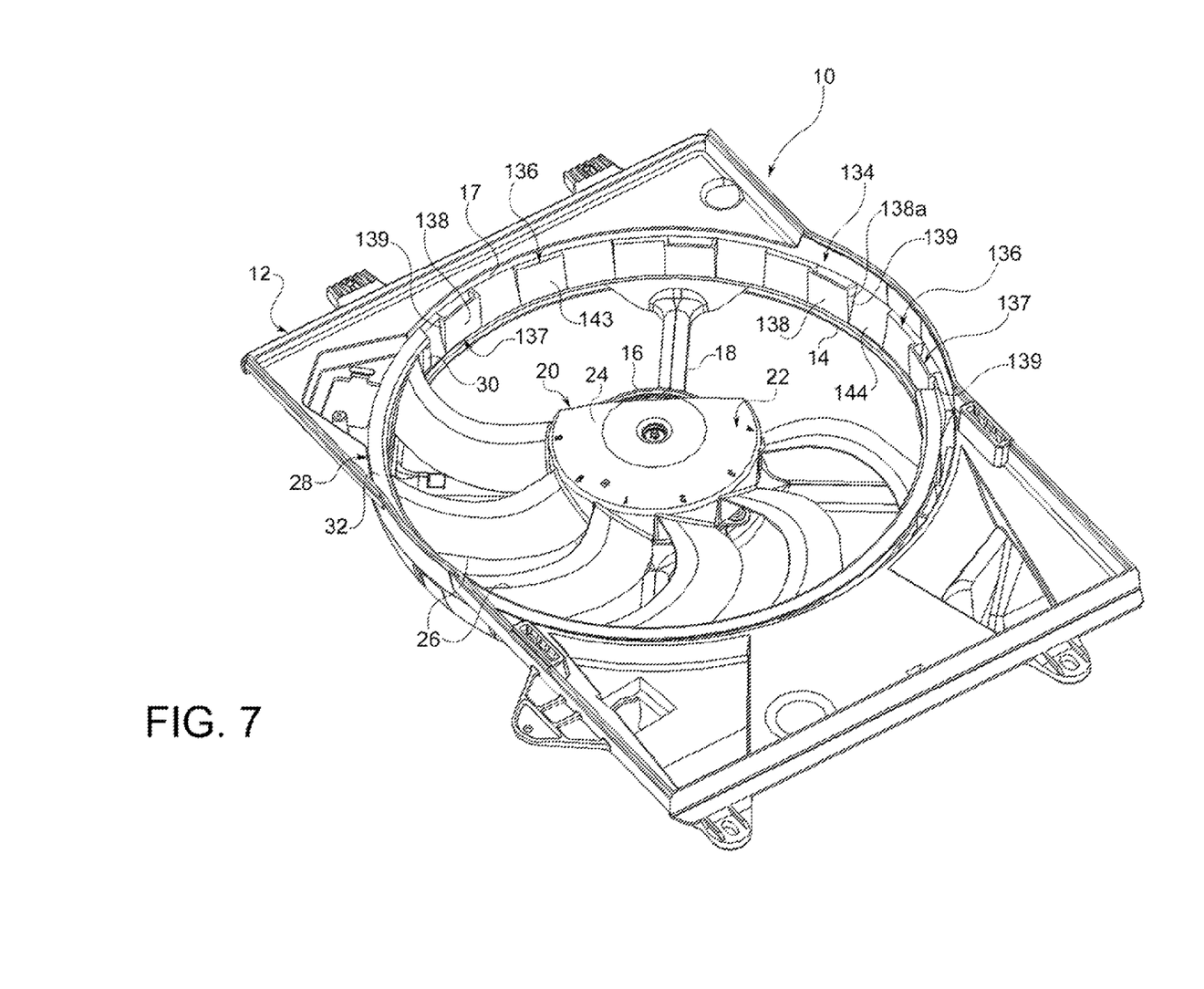
FIGS. 7 and 8 are perspective views of a second embodiment of the fan assembly according to the invention.
Figure 8:
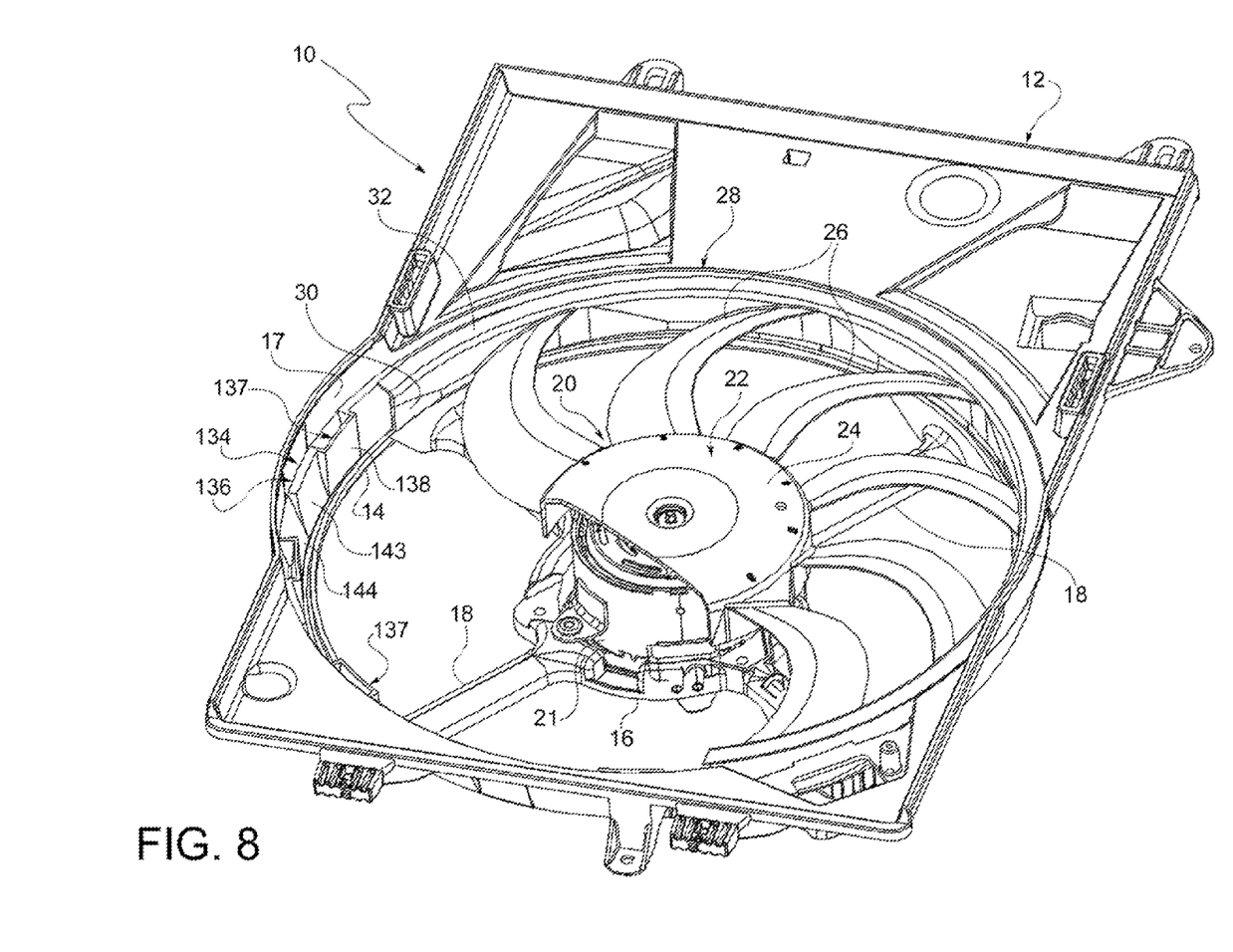
Figure 9:
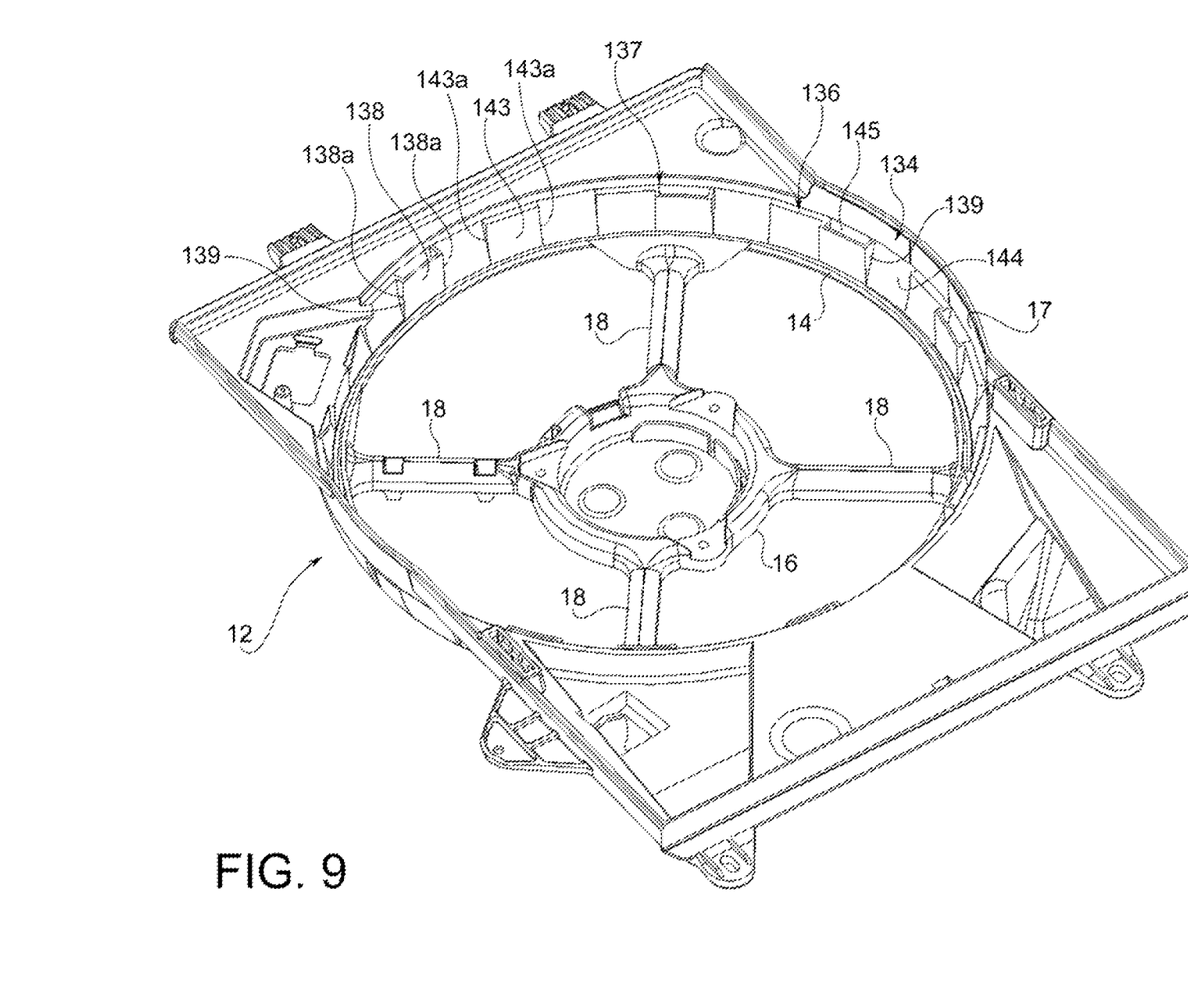
FIG. 9 is a perspective view of a shroud of the fan assembly according to FIG. 7.

The noise-reducing annular structure 34 also comprises a collar formation 41 extending circumferentially along the air conveying ring 17 and having a substantially triangular cross-section, as can be seen in FIG. 6.

This collar formation 41 extends in an axial direction from the bottom wall of the air conveying ring 17 and is divided into collar portions 43 which interconnect the prism formations 36. These collar portions 43 each have a radially inner face 44 which is directed towards the axis of rotation X of the fan and the profile of which in the axial direction is generally curvilinear and not parallel to the axis of rotation, as can be seen in particular in FIG. 6. Owing to this arrangement, the collar portions 43 therefore form portions which are radially recessed (with respect to the projections formed by the prism formations) towards the air conveying ring 17.

The collar portions 43 are also radially spaced from the side wall of the air conveying ring 17 and co-operate with this side wall (and with the prism formations 36) so as to form respective pockets 45 which are axially open towards the air inlet side of the fan assembly, as can be seen in particular in FIG. 4.

As can be understood, the noise-reducing annular structure described above maintains the fluid dynamic interaction between the fan and conveyor, forming a "labyrinth seal", and diffuses the reflected noise waves, reducing the tonal component of the noise produced.

This is achieved owing to the following measures:

the presence of faces terminating in defined edges (the faces of the prism formations) close to the outer ring of the fan has the effect that the generation of vortices between the fan and the conveyor can be controlled and the presence of spaces (the recessed collar portions and the pockets) has the effect that the vortices are able to dissipate their energy;

the form of the facing wall on the fan (the collar formation) is such that the fan-conveyor distance varies continuously in the axial direction so that the noise reflection impedance varies continuously in the axial direction;

the alternation of projections (prism formations) and recessed portions (collar portions) is such that the noise reflection impedance varies also in the circumferential direction.

The small distance between fan and conveyor ensures a good aerodynamic performance, while the irregular form of the noise-reducing annular structure prevents sound-wave generating reflection effects by varying the impedance of the system to noise in all directions.

With reference to FIGS. 7 to 12, a second embodiment of the fan assembly according to the invention is now described.

Parts which correspond to those of the previous embodiment have been assigned the same reference numbers; these parts will not be further described.

The shroud 12 of the fan assembly now shown has a number of structural differences compared to that described previously, these differences not being described here since they are not essential for the purposes of the invention.

Figure 10:
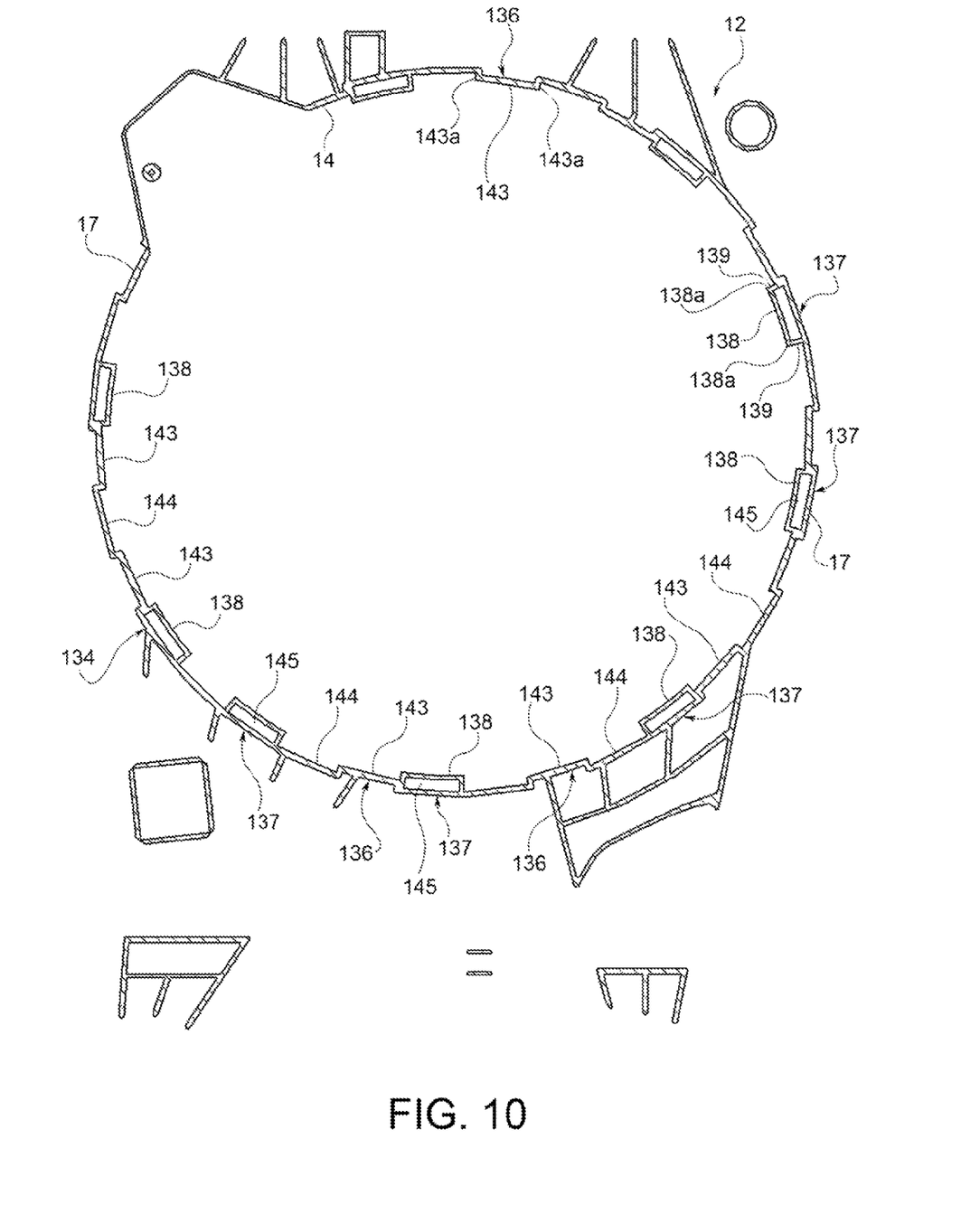
FIG. 10 is a cross-sectional view of the shroud according to FIG. 7.
Figure 11:
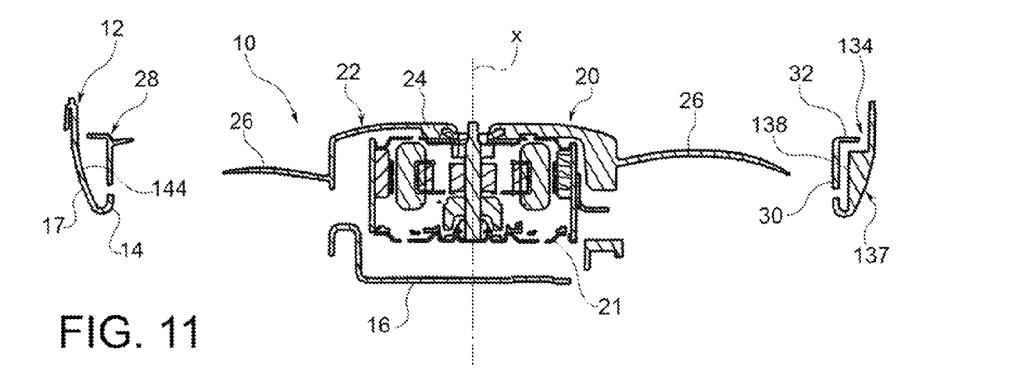
FIGS. 11 to 13 are cross-sectional views of the fan assembly according to FIG. 7 along different radial planes.
Figure 12:
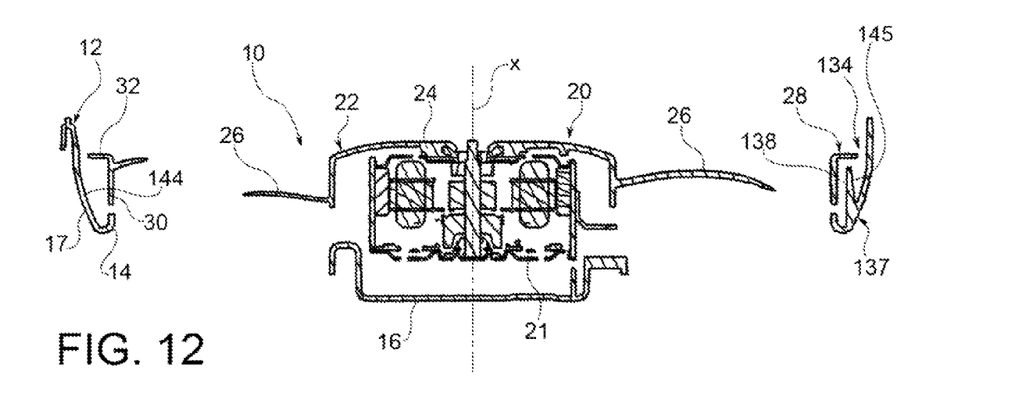

Essentially, the shroud 12 comprises a noise-reducing annular structure 134 with a form different from that described previously. This annular structure 134 is fixed to or formed integrally with the shroud and is situated along the air conveying ring 17 and therefore joined to this ring. The noise-reducing annular structure 134 surrounds the fan 22 and is provided with a plurality of first and second ledge formations 136, 137 which are arranged in succession in a circumferential direction. Each ledge formation 136, 137 has a substantially quadrilateral, straight or arcuate top side and extends in an axial direction as far as a bottom wall of the air conveying ring 17. Each ledge formation 136, 137 also extends in a radial direction from a side wall of the air conveying ring 17, forming a projection which extends radially towards the axis of rotation X of the fan 22. As can be seen in FIG. 10, the ledge formations 136, 137 are hollow formations. The first ledge formations 136 define respective cavities which emerge on the radially outer side of the air conveying ring 17, while they are closed on the radially inner side and on the air inlet side of the conveyor assembly (top side in the figures). The second ledge formations 137, which project radially towards the axis X of the fan assembly, by a greater amount than the first ledge formations 136, form respective pockets, which will be described further below.

Each second ledge formation 137 has a radially inner face 138, which is bounded in the circumferential direction by side edges 138a and is directed towards the axis of rotation X and is substantially parallel thereto, and a pair of side faces 139, which extend from the side edges 138a as far as the air conveying ring 17.

Figure 13:
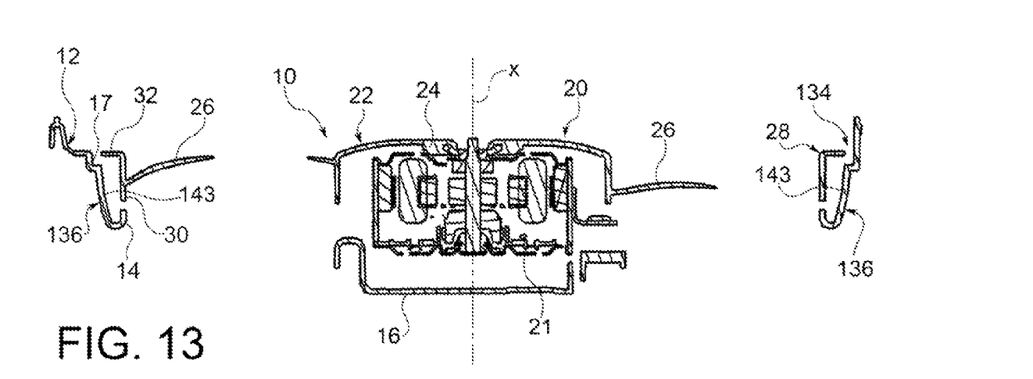

Each ledge formation 136 has a radially inner face 143 which is directed towards the axis of rotation X and the profile of which in the axial direction is generally curvilinear and not parallel to the axis of rotation, as can be seen in particular in FIG. 13. Some of the ledge formations 136 have respective radially inner faces 143 which are bounded in the circumferential direction by side edges 143a and have a pair of side faces which extend from the side edges 143a as far as the air conveying ring 17. Others of the first ledge formations 136 are adjacent to at least one of the second ledge formations 137 so that the respective radially inner faces 143 are connected to one of the side faces 139 of the second adjacent ledge formation(s) 137.

In the positions where the ledge formations 136, 137 are absent, the air conveying ring 17 directly faces the axis of rotation X. In these positions the air conveying ring 17 therefore defines portions with a radially inner face 144 which are directed towards the axis of rotation X of the fan and the profile of which in the axial direction is generally curvilinear and not parallel to the axis of rotation, as can be seen in particular in FIG. 12.

Owing to the arrangement described above, the first ledge portions 136 and the portions with a radially inner face 144 form portions which are radially recessed (with respect to the projections formed by the second ledge formations 137) towards the air conveying ring 17.

The second ledge portions 137 are hollow, each of them having a radially inner wall (along which the respective radially inner face 138 is formed) which is radially spaced from the side wall of the air conveying ring 17 and co-operating with this side wall so as to form a respective pocket 145 which is axially open towards the air inlet side of the fan assembly, as can be seen in particular in FIG. 10.

As can be understood, the noise-reducing annular structure described above maintains the fluid dynamic interaction between fan and conveyor, forming a "labyrinth seal", and diffuses the reflected noise waves, reducing the tonal component of the noise produced.

This is achieved owing to the following measures:

the presence of faces terminating in defined edges (the faces of the second ledge formations) close to the outer ring of the fan has the effect that the generation of vortices between the fan and the conveyor can be controlled and the presence of spaces (the first ledge formations and the portions with a radially inner face of the conveying ring and the pockets) has the effect that the vortices are able to dissipate their energy;

the form of the facing wall on the fan (the first ledge formations and the radially inner faces of the conveying ring) is such that the fan-conveyor distance varies continuously in the axial direction so that the noise reflection impedance varies continuously in the axial direction;

the alternation of projections (second ledge formations) and different-depth recessed portions (the first ledge formations and the portions with a radially inner face of the conveying ring) is such that the noise reflection impedance also varies in the circumferential direction.

The small distance between fan and conveyor ensures a good aerodynamic performance, while the irregular form of the noise-reducing annular structure prevents sound-wave generating reflection effects by varying the impedance of the system to noise in all directions.

While the foregoing is directed to embodiments of the present invention, other and further embodiments of the invention may be devised without departing from the basic scope thereof, and the scope thereof is determined by the claims that follow.

The invention claimed is:

1. A fan assembly for cooling a radiator, a radiator-condenser assembly, or a radiator-condenser-intercooler assembly of a vehicle, comprising:
   a shroud, having a through opening around which said shroud defines an air conveying ring, and a support which is located at a centre of said opening,
   a motor-fan assembly carried by said support, which includes an axial fan rotatable with respect to said support about an axis of rotation, and
   a noise reducing ring structure, fixed with respect to the air conveying ring and surrounding said fan, said ring structure having
   a plurality of projections that follow one another in a circumferential direction and extend radially toward the axis of rotation of the fan, each projection having a face bounded by side edges in the circumferential direction, which faces toward said axis of rotation and is substantially parallel thereto, and
   a plurality of recessed portions radially recessed toward the air conveying ring and alternated with said projections,
   wherein each of said recessed portions has a face facing toward the axis of rotation of the fan, whose profile in an axial direction is generally curvilinear and unparallel to said axis of rotation, and
   wherein said ring structure comprises
   a plurality of quadrilateral prism formations which follow one another in the circumferential direction, each prism formation extending in the axial direction from a bottom wall of the air conveying ring, and in radial direction from a side wall of the air conveying ring, and
   a collar formation extending circumferentially along the air conveying ring and having a substantially triangular cross section, and divided into collar portions interconnecting the prism formations,
   wherein said prism formations constitute said projections and said collar portions constitute said recessed portions.

2. A fan assembly according to claim 1, wherein said ring structure has a plurality of ring structure portions radially spaced from a side wall of the air conveying ring, which cooperate with said side wall for forming corresponding pockets opened axially toward the air inlet side of the fan assembly.

3. A fan assembly according to claim 2, wherein said pockets are formed by the collar portions in cooperation with the side wall of the air conveying ring.

4. A fan assembly for cooling a radiator, a radiator-condenser assembly, or a radiator-condenser-intercooler assembly of a vehicle, comprising:

a shroud, having a through opening around which said shroud defines an air conveying ring, and a support which is located at the centre of said opening, a motor-fan assembly carried by said support, which includes an axial fan rotatable with respect to said support about an axis of rotation, and a noise reducing ring structure, fixed with respect to the air conveying ring and surrounding said fan, said ring structure having a plurality of projections that follow one another in a circumferential direction and extend radially toward the axis of rotation of the fan, each projection having a face bounded by side edges in the circumferential direction, which faces toward said axis of rotation and is substantially parallel thereto, and a plurality of recessed portions radially recessed toward the air conveying ring and alternated with said projections, wherein each of said recessed portions has a face facing toward the axis of rotation of the fan, whose profile in axial direction is generally curvilinear and unparallel to said axis of rotation, and wherein said ring structure comprises:

a plurality of first and second ledge formations which follow one another along the circumferential direction, each of which having a substantially quadrilateral, straight or arcuate, top side, and extending in an axial direction to a bottom wall of the air conveying ring, and in radial direction from a side wall of the air conveying ring, the second ledge formations projecting radially toward the axis of rotation of the fan by a greater extent than the first ledge formations, wherein the air conveying ring has radially inner faces directly facing toward said axis of rotation, and wherein said second ledge formations constitute said projections and said first ledge formations and said radially inner faces of the air conveying ring constitute said recessed portions.

5. A fan assembly according to claim 4, wherein said pockets are formed by the second ledge formations in cooperation with the side wall of the air conveying ring.

\* \* \* \* \*